J. P. COLEMAN.
RAILWAY SIGNAL.
APPLICATION FILED JAN. 31, 1914.

1,194,715.

Patented Aug. 15, 1916.
4 SHEETS—SHEET 1.

WITNESSES
W. T. Holman.
A. L. Vencill.

INVENTOR
John P. Coleman
by Geo. E. Cruse
His Attorney

J. P. COLEMAN.
RAILWAY SIGNAL.
APPLICATION FILED JAN. 31, 1914.
1,194,715.
Patented Aug. 15, 1916.
4 SHEETS—SHEET 2.
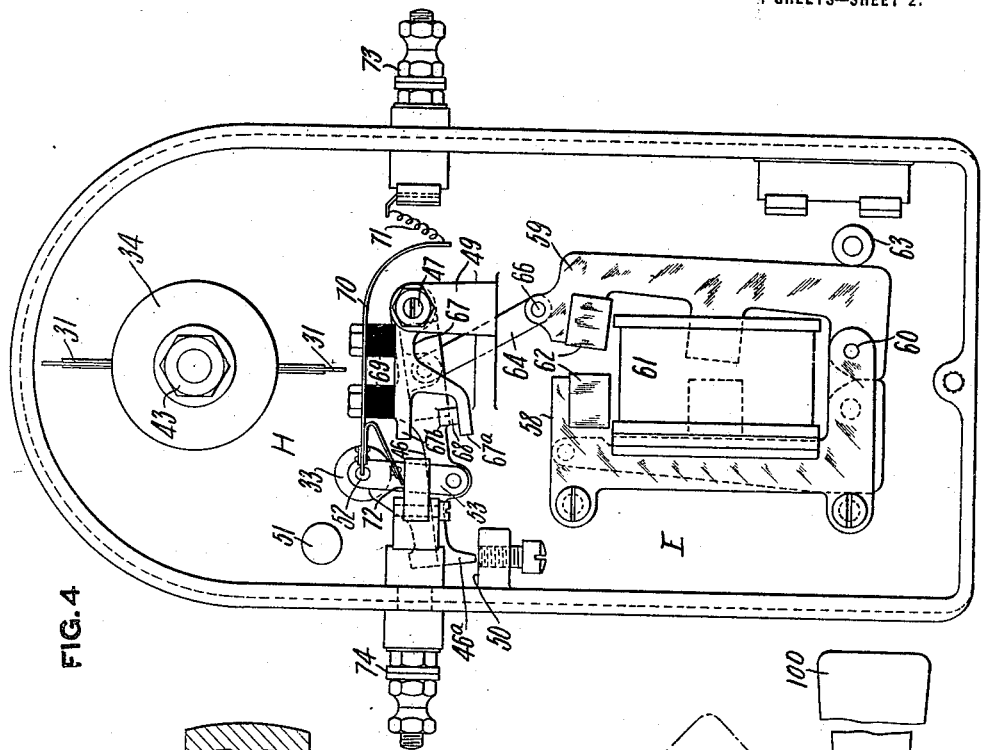
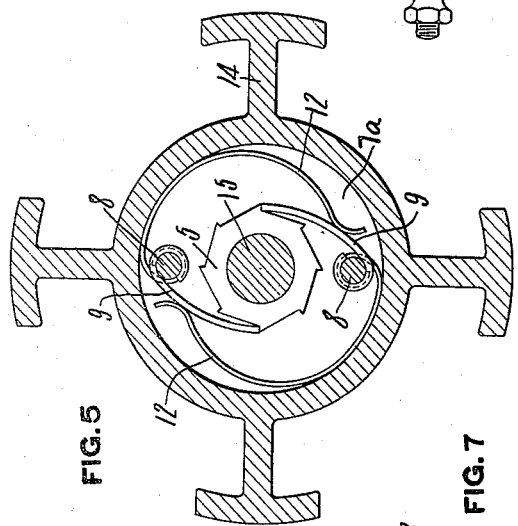
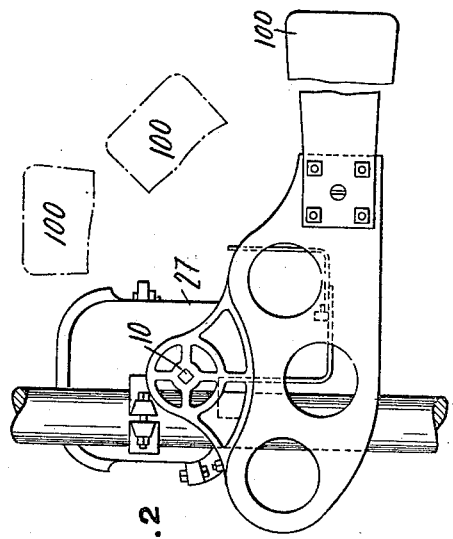
WITNESSES
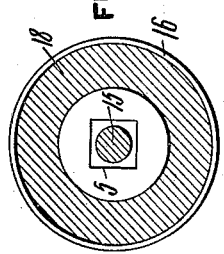
INVENTOR
John P. Coleman
By Geo. E. Cruse
His Attorney J. P. COLEMAN.
RAILWAY SIGNAL.
APPLICATION FILED JAN. 31, 1914.
1,194,715.
Patented Aug. 15, 1916.
4 SHEETS—SHEET 3.
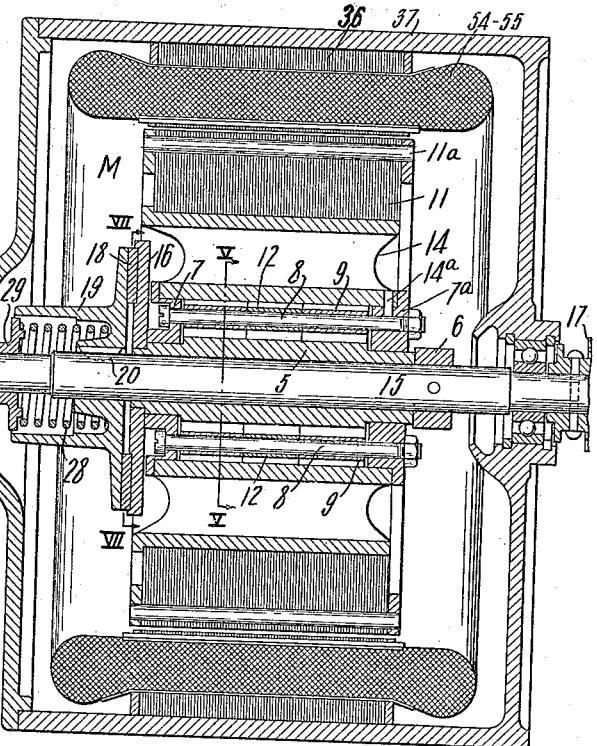
FIG. 3
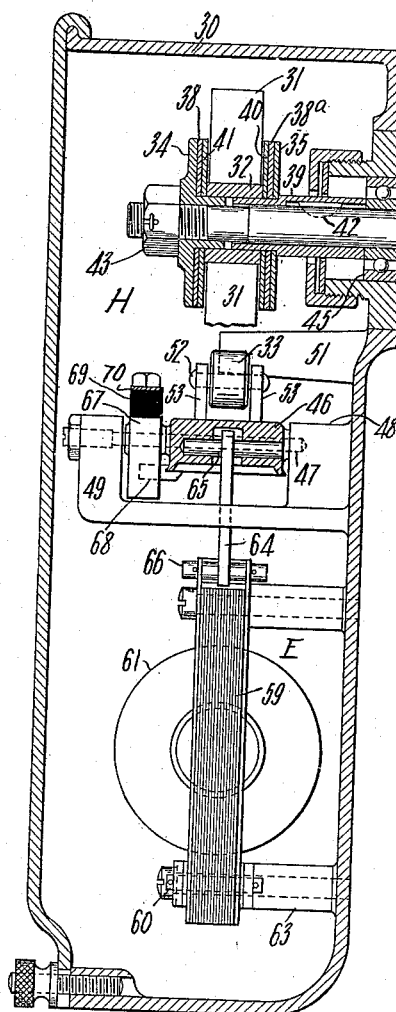
FIG. 8
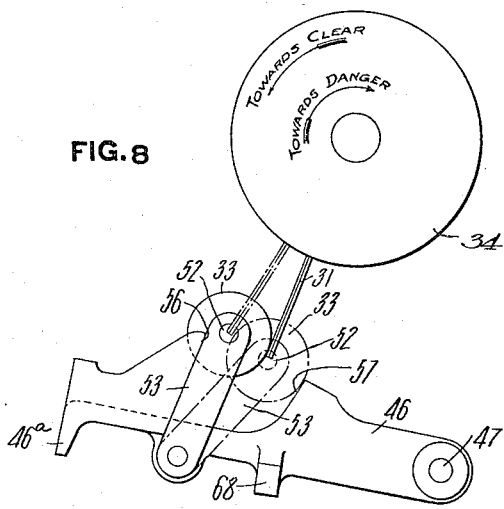
WITNESSES
N. T. Holman
A. L. Vencill
INVENTOR
John P. Coleman
By Geo. E. Cruse
His Attorney

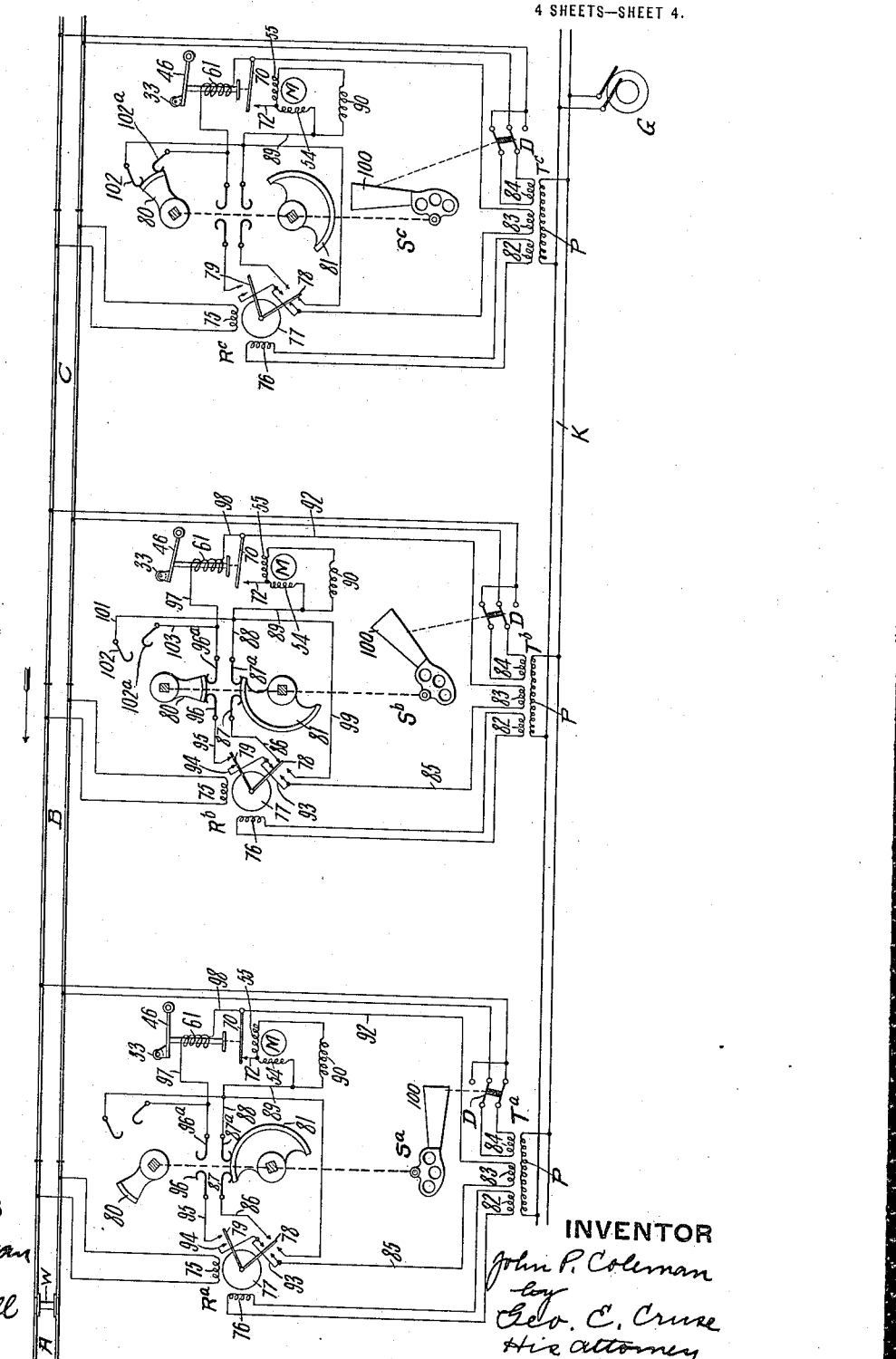

UNITED STATES PATENT OFFICE.

JOHN P. COLEMAN, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-SIGNAL.

1,194,715.    Specification of Letters Patent.    Patented Aug. 15, 1916.

Application filed January 31, 1914. Serial No. 815,673.

*To all whom it may concern:*

Be it known that I, JOHN P. COLEMAN, a citizen of the United States, residing at Edgewood Borough, in the county of Allegheny and State of Pennsylvania, have invented certain new and useful Improvements in Railway-Signals, of which the following is a specification.

My invention relates to railway signals, and particularly to signals of the type comprising a semaphore biased toward one position and a motor for moving it to one or more other positions against the action of the biasing force.

I will describe one form of signal embodying my invention, and will then point out the novel features thereof in claims.

Figure 1:
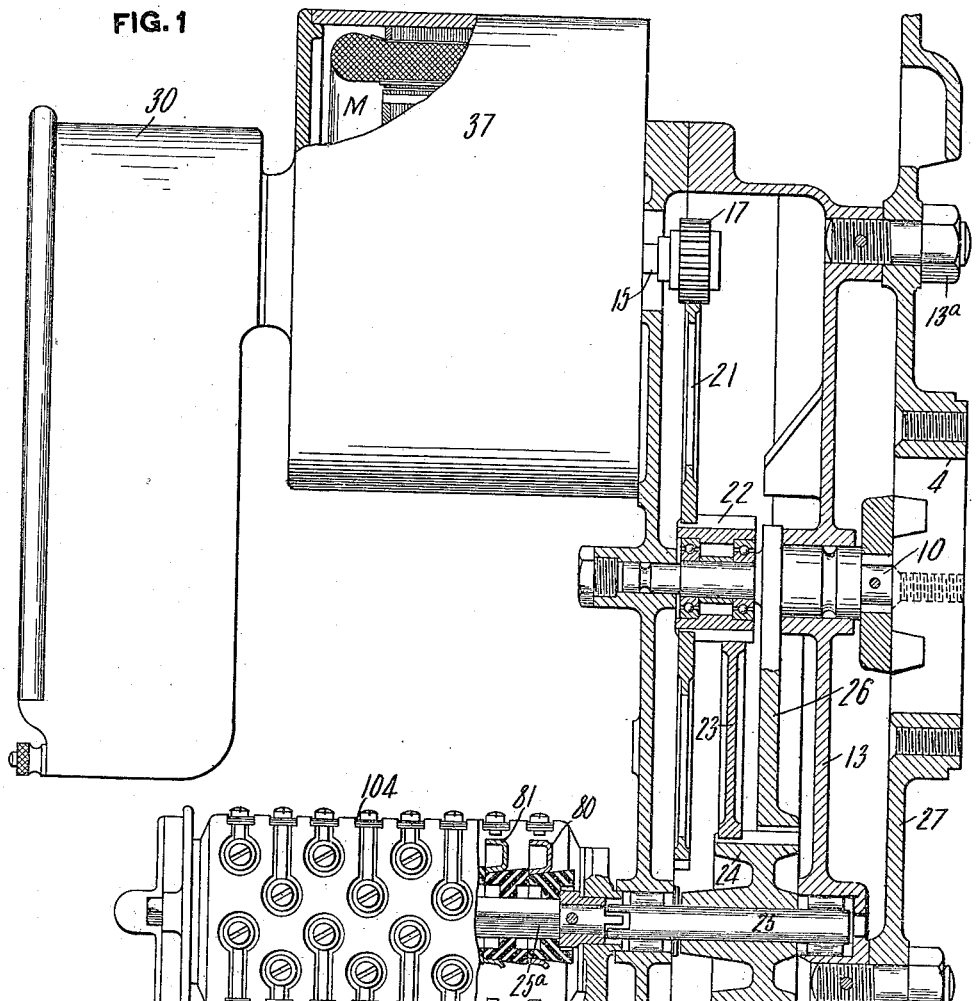
Figure 6:
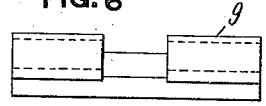

In the accompanying drawings, Figure 1 is a side view, partly sectioned, showing one form of railway signal mechanism embodying my invention, the semaphore being removed. Fig. 2 is a view showing in front elevation the inclosing case for the mechanism shown in Fig. 1, and also showing the semaphore. Fig. 3 is a view showing in vertical section an electric motor M, a holding device H, and an electromagnetic device E comprised in the mechanism shown in Fig. 1. Fig. 4 is a view showing in end elevation the holding device H and electromagnetic device E shown in Fig. 3. Fig. 5 is a sectional view on the plane indicated by line V—V of Fig. 3 looking in the direction of the arrows. Fig. 6 is a view showing a pawl 9 shown in Figs. 3 and 5. Fig. 7 is a sectional view on the plane indicated by the line VII—VII in Fig. 3. Fig. 8 is a fragmental view of a portion of the holding device H shown in Fig. 4, showing the arm 46 in a different position and showing the roller 33 and blade 31 in two different positions. Fig. 9 is a diagrammatic view showing three signals embodying my invention in the danger, caution and clear positions respectively, and showing the conditions of the operating and controlling circuits for each of these positions.

Similar reference characters refer to similar parts in each of the several views.

Referring first to Figs. 1 and 2, 27 is an outside signal case (only the front portion of which is shown in Fig. 1) within which is mounted a gear-inclosing casing 13, which latter is fixed to the front of case 27 by screws 13ª. Mounted in suitable bearings in the casing 13 is a shaft 10 which projects through a suitable hole 4 in the case 27, and to the projecting end of which a semaphore 100 is fixed (see Fig. 2). This semaphore is biased by gravity to the horizontal or danger position of indication, and is moved to one or more other positions by electric motor M through the medium of suitable gearing in casing 13 as hereinafter explained. In the particular arrangement here shown, the semaphore 100 is moved upwardly to a caution and a clear position, as indicated in dash lines in Fig. 2, but it is understood that the mechanism may equally well be arranged for the semaphore to be moved downwardly from the horizontal position to its other positions of indication. Fixed to the casing 13 is a cylindrical box 37 within which is journaled a spindle 15, which is connected with motor M through a ratchet device as hereinafter explained. This spindle is connected with the semaphore 100 by means of suitable gearing inclosed in the casing 13, which gearing, as here shown, comprises a segmental gear wheel 26 fixed on the shaft 10, a pinion 24 and a gear wheel 23 rigidly connected and fixed on a shaft 25 journaled in the casing 13, a pinion 22 and a gear wheel 21 rigidly connected and mounted on ball bearings carried on the shaft 10, and a pinion 17 mounted on the spindle 15. Operatively connected with shaft 25 is another shaft 25ª which operates a circuit controller 104 which, as here shown, is similar to the circuit controller shown and described in my co-pending application filed June 26, 1913, Serial No. 775,840, for circuit controllers.

Referring now to Fig. 3, the motor M, which is employed to move the semaphore 100 from its danger position to its caution and clear positions, is mounted in the box 37 and is, as here shown, a two-phase induction motor comprising a stator 36, a stator winding 54—55, and a squirrel-cage rotor 11 comprising as usual a plurality of bars 11ª. The rotor 11 is fixed on a spider 14 (see also Fig. 5) which is freely mounted on the spindle 15 but is operatively connected therewith by means of a ratchet device which I will now explain, referring to Figs. 3, 5, 6 and 7. A ratchet 5 is mounted on the spindle 15 to rotate freely thereon, and is prevented from longitudinal movement in one direction by a collar 6 fixed on the spindle by a pin. Mounted on the ends of the ratchet to rotate freely thereon are two heads 7 and 7ª, which carry the spider 14, the spider being fixed to these heads by a dowel pin 14ª in one head and by a similar pin in the other head. The heads 7 and 7ª are connected by two bolts 8, 8 which serve as pivot pins for pawls 9, 9, which latter coact with the ratchet 5 as shown clearly in Fig. 5. One of these pawls 9 is shown separately in Fig. 6, from which it will be seen that the pawls are not supported throughout their entire length by the bolts 8, but are cut away adjacent the middle to leave a portion of the bolts free, around which latter portions are wrapped springs 12 which press the pawls toward the ratchet. The ratchet 5 is connected with spindle 15 through the medium of a friction device which is as follows: The left-hand end of the ratchet is squared as shown in Fig. 7, and on this squared end is fitted a disk 16 which is provided with a square hole which matches the squared end of the ratchet. This disk is provided with an annular recess in which is mounted a disk 18 of fiber or other suitable frictional material, which bears against a head 19 mounted on the spindle 15. This head 19 is connected with the spindle by a key 20 which constrains the member to rotate with the spindle but permits the head to slide longitudinally on the spindle. The head 19 is pressed toward the ring 16 by a spring 28, one end of which abuts against the head 19 and the other end of which abuts against a sleeve 29 for purposes hereinafter explained. When the motor M is to move the semaphore, the rotor 11 and spider 14 revolve in counter-clockwise direction as viewed in Fig. 5, so that the rotor is then operatively connected with spindle 15 through the pawl and ratchet device; but the rotor 11 may rotate backward without an accompanying rotation of the spindle 15. It will be seen, therefore, that the rotor 11 is rotated backwardly while the semaphore 100 is returning toward its danger position, but that when the semaphore is stopped during this movement the rotor 11 is left free to rotate idly until its momentum is absorbed, thereby avoiding injury which might be caused to the moving parts by sudden stoppage of the rotor. Fixed to the box 37 is another box 30 which incloses a holding device H and an electromagnetic device E.

In my invention the holding device H performs two functions, viz., it arrests the momentum of the moving parts when the signal accurately assumes the caution and the clear position, and it holds the signal in these positions against the action of gravity on the semaphore. Referring to Figs. 3, 4 and 8, the holding device H comprises a collar 32 operatively connected with the spindle 15 and provided with one or more blades 31 of resilient material, two blades being provided in the form here shown. Each blade is preferably formed of laminations of clock spring steel, thereby providing blades which have great toughness yet which are resilient and light. These blades coact with a roller 33 which is movable into and out of the path of the blades as hereinafter explained. The collar 32 is not fixed on the spindle 15, but is connected therewith through the medium of a friction clutch by means of which the collar is permitted to slip on the spindle in case of severe torsional stress. This clutch is as follows: The collar 32 is mounted to rotate freely on a hub one part of which is formed by a ring 34 mounted freely on the spindle and the other part of which is formed by a sleeve 39 also located on the spindle. The sleeve 39 is connected with the spindle by a key 42 which constrains the sleeve to rotate with the spindle but which permits it to slide longitudinally on the spindle. The ring 34 abuts against a nut 43 which is screwed on the threaded end of the spindle, and the sleeve 39 is pressed toward the ring 34 by the spring 28 which abuts against the sleeve 29. Interposed between the sleeve 29 and the sleeve 39 is one portion of a ball-bearing 45 in which the spindle revolves and which transmits to the sleeve 39 the force exerted by spring 28. The collar 32 is located between two disks 40 and 41; between the disk 41 and the ring 34 is a disk 38 of frictional material such as fiber, and a second disk of similar frictional material is located between disk 40 and another disk 35 which rests against a shoulder on sleeve 39. It will be seen, therefore, that the collar 32 is clamped to the sleeve 39, and moves relatively to the latter only in case of severe torsional stress.

The roller 33 which coacts with blades 31 is carried by an arm 46 which latter is mounted to oscillate on a shaft 47. This shaft is supported in a lug 48 which is integral with the wall of box 30, and also in another lug 49 which is an extension of the lug 48. The oscillation of arm 46 is limited by the engagement of the lower end of a projection 46ª with a lug 50 formed in the box 30, and by the engagement of the upper end of this projection with another lug 51 formed in the box; the oscillation permitted by these lugs is such that the roller 33 moves into and out of the path of the blades 31. The arm 46 is biased by gravity to the lowest position, in which position the roller is out of the path of the blades, and may be moved to and held in the highest position by the electromagnetic device E. The roller 33 is not journaled directly in arm 46, but rotates on a pin 52 mounted in links 53, 53, which latter are pivoted to the arm 46. The roller and links are thus free to swing with relation to the arm, their motion being limited in one direction by the engagement of the links with shoulders 56 on the arm, and in the other direction by the engagement of the roller with another shoulder 57 formed on the arm. The purpose of thus mounting the roller will appear hereinafter.

As has been mentioned hereinbefore, the holding device H performs two functions, viz., it arrests the momentum of the moving parts when the signal accurately assumes the caution and clear positions, and it holds the signal in these positions against the action of gravity on the semaphore. Hence, the arm 46 is down while the signal is moving toward clear position, but is raised when the signal reaches the caution and the clear positions. During the movements of the signal toward clear position and toward danger position respectively, the directions of rotation of the blades 31 are as indicated by the arrows in Fig. 8. Assume now that the motor M is moving the signal away from the danger position and that having arrived at the caution position the arm 46 is elevated by the electromagnetic device E. The elevation of arm 46 effects the interruption of the motor current by means of a contact operated by the arm as hereinafter explained, and it also moves the roller into the path of blades 31. One of the blades will then come into contact with the roller and will move the latter into the position shown in dash lines in Fig. 8. The parts of the apparatus are so proportioned and arranged that when in this position the line of action of the pressure between the roller and the blade will lie in the straight line joining the pivotal point of the arm 46 and the pivotal point of roller 33, so that gravity, acting on the arm and parts connected therewith, is the only force tending to move the roller downwardly out of the path of the blade. The roller therefore constitutes an absolute lock to prevent further rotation of the blades, and in consequence, the momentum of the semaphore and the other parts which move with the spindle 15 is arrested. It will be seen, therefore, that a very definite position of the semaphore may be obtained by accuracy in the adjustment of the medium by which the electromagnetic device E is energized during the operation of the signal. If the semaphore is to be retained in the caution position, the arm 46 remains in the raised position and the drum 32 swings around until the other blade 31 comes into contact with the roller; the roller and links are then swung to the positions indicated in full lines in Fig. 8. The line of action of the pressure between the roller and the blade is now not in the straight line joining the pivotal point of the roller and the pivotal point of arm 46, but crosses this line in such direction that it tends to assist gravity to move the roller downwardly out of the path of the blade. This tendency must be successfully resisted by the electromagnetic device E in order to hold the semaphore in the caution position.

Although in Fig. 8 the blade 31 is shown straight in both positions, in practice this blade actually bends slightly when acting on the roller to hold the signal, thereby increasing the force tending to move the roller out of the path of the blade. This force varies according to the amount of flexure of the blade, hence in case snow or ice accumulate on the semaphore 100 the additional weight will cause further flexure of the blade, thereby increasing the force tending to move the roller away and thus overcoming the additional friction on pins 47 and 52 that results from this additional pressure on them. The blade also bends slightly when arresting the momentum of the moving parts, but the flexure at this time is so slight that in practice it may be disregarded.

When the signal is moved from caution to clear position, the operations of the holding device in arresting the movement and holding the semaphore are the same as the corresponding operations for the caution position, hence no explanation is necessary.

The reason for mounting roller 33 in links 53 carried by arm 46 is, that if this roller were journaled directly in arm 46 and the parts so proportioned that when the device is arresting the momentum of the moving parts the blades would exert no force on the roller tending to move it out of their path, then when the device is holding the signal against gravity the angle of action on the roller would be excessive and the roller would be moved out of the path of the blades unless the electromagnetic device E were excessively powerful, or the roller 33 made undesirably small in diameter.

The electromagnetic device E which controls arm 46 may be of any suitable type; as here shown, it is similar to the device shown in United States Letters Patent No. 984,748, granted to me on February 21, 1911, for electromagnetic apparatus. Briefly described, the device in the form here shown comprises two oppositely disposed E-shaped core members 58 and 59 of laminated soft iron, the former of which is fixed to the wall of box 30 and the other of which, 59, is pivotally mounted on a shaft 60 supported by core member 58. An energizing winding 61 is mounted on core member 58 in such manner that it surrounds the middle leg of each member. The two upper legs of each member are provided with closed bands 62 of electro-conductive material to prevent chattering when winding 61 is energized by alternating current. Core member 59 is connected with arm 46 by a link 64 which is pivotally connected with a pin 66 mounted in the core member, and with another pin 65 mounted in the arm. Core member 59 is biased by gravity to the position in which it is shown in Fig. 4, its movement being limited by a stop 63 fixed in the box; when in this position, arm 46 rests in the lowest position of its stroke and roller 33 is out of the path of blades 31. When winding 61 is energized, core member 59 is swung on its pivot 60 toward member 58, thereby raising arm 46, so that the roller moves into the path of the blades.

As mentioned hereinbefore, the motor circuit is controlled by a contact operated by the arm 46, which contact I will now describe, referring particularly to Figs. 3 and 4. Mounted to oscillate on shaft 47, which carries arm 46, is a second arm 67 on which a contact spring 70 is supported by insulation studs 69. One end of spring 70 is connected through a flexible conductor 71 with a terminal post 73 mounted in box 30, and the other end is adapted to make contact with a block 72 forming part of another terminal post 74 mounted also in box 30. The arm 67 is bifurcated to form two fingers $67^a$ and $67^b$ between which is located a lug 68 projecting from arm 46. When arm 46 is in its lowest position, as shown in Fig. 3, lug 68 engages the lower finger $67^a$ and thereby holds arm 67 down so that contact 70—72 is closed. When arm 46 is raised by the electromagnetic device E, lug 68 strikes the upper finger $67^b$ and raises arm 67 thereby opening contact 70—72. It will be seen that there is considerable lost motion between the lug 68 and fingers $67^a$ and $67^b$ so that contact 70—72 is not opened until the roller 33 is moved into the path of blades 31, hence the motor circuit is not opened until the roller is in position to stop the signal. Another feature of this lost motion construction is that by the time the lug reaches the upper finger $67^b$ the arm 46 and core member 59 have acquired considerable momentum, and the lug therefore strikes the finger with a blow of considerable force; in case contact 70—72 has become stuck or fused it may be disengaged by this blow.

Referring now to Fig. 9, I have here shown a stretch of railway track provided with signals embodying my invention, the normal direction of traffic along the stretch being as indicated by the arrow. The stretch is divided into block sections, A, B and C, which sections are protected by signals $S^a$, $S^b$ and $S^c$ respectively, and which signals are controlled by track circuits for the several sections. Alternating current for the track circuits and for the operation of the signals is obtained from secondaries of transformers $T^a$, $T^b$, and $T^c$, whose primaries P are connected with transmission mains K to which current is supplied by a generator G. The signals are controlled by relays $R^a$, $R^b$, and $R^c$, which relays as here shown are of the induction motor type, each comprising two windings 75 and 76, and a cylindrical rotor 77 which operates contact fingers 78 and 79. Winding 75 of each relay is connected with the track rails of the section over which the corresponding signal governs traffic, and winding 76 is connected with a secondary winding 82 of the adjacent transformer T. Current is supplied to the track rails of each section from a secondary 84 of a transformer T through the medium of a pole-changer D operated by the signal at the exit end of the section, which pole-changer is reversed during the movement of the signal between danger and caution, but is not affected by the movement of the signal between caution and clear. 80 and 81 are two of the contact segments included in the circuit controller 104 shown in Fig. 1.

The operation of the apparatus shown in Fig. 9 is as follows: Block section A is occupied by a car or train W so that signal $S^a$ is at stop position, signal $S^b$ at caution and signal $S^c$ at clear. When the car or train W passes out of section A into the section next in advance, relay $R^a$ will be energized in such direction that its contacts 78 and 79 will move upwardly thereby closing the following motor circuit: from secondary 83 of transformer $T^a$ through wires 85 and 93, contact finger 78, wire 86, contact 87, segment 81, contact $87^a$, wires 88 and 89, windings of motor M (including a reactance 90 in series with one winding), contacts 72—70, wire 92 to secondary 83 of transformer $T^a$. The motor will then drive the signal toward caution, and just as the latter position is reached, segment 80 will bridge contacts 96 and $96^a$, thereby closing the following circuit through the winding 61 of the holding device: from secondary 83 through wires 85, 93 and 94, contact finger 79, wire 95, contact 96, segment 80, contact $96^a$, wire 97, winding 61, wires 98 and 92 to secondary 83. The energization of this winding raises arm 46, thereby opening the motor operating circuit and also moving roller 33 into the path of the blades 31, so that the signal is instantly brought to rest in the caution position. The parts then occupy the positions in which the parts of signal $S^b$ are shown in Fig. 9. During the movement of signal $S^a$ from danger to caution position, the semaphore 100 of this signal has reversed the corresponding pole-changer D, thereby reversing relay $R^b$ so that contact fingers 78 and 79 of this relay are moved downwardly. The opening of contact finger 79 deënergizes winding 61 so that arm 46 falls, thereby permitting the movement of roller 33 out of the path of the blades 31 and also closing contact 72—70. The closing of this latter contact closes a motor circuit from secondary 83 of transformer T^b, through wire 85, contact finger 78, wires 99 and 89, motor M, contact 72—70, wire 92 to secondary 83. The motor then drives the signal toward the clear position and just as the latter position is reached, segment 80 bridges contacts 102 and 102^a, thereby energizing winding 61 through the following circuit: from secondary 83, through wire 85, contact finger 78, wires 99 and 101, contact 102, segment 80, contact 102^a, wires 103 and 97, winding 61, wires 98 and 92 to secondary 83. Arm 46 is thereby raised to open the motor circuit and to stop the signal positively in the clear position by means of roller 33.

Although I have herein shown and described only one form of signal embodying my invention, it is understood that various changes and modifications may be made therein within the scope of the appended claims without departing from the spirit and scope of my invention.

Having thus described my invention, what I claim is:

1. In combination, a signal biased in one direction, means for moving it in opposition to the biasing force, a rotatable member operatively connected with said signal, a blade carried by said member; a pivotally mounted arm, a roller journaled in said arm, the movement of the arm on its pivot being such that the roller moves into and out of the path of said blade; the relation between the blade, arm and roller being such that when the signal is moving in opposition to its biasing force and the roller is in the path of the blade the line of action of the pressure between the blade and roller lies substantially in the straight line between the pivotal point of the roller and the pivotal point of the arm, but that when the signal is moving or tending to move in response to the biasing force the said line of action of the pressure intersects said straight line in such direction that a force is then exerted by the blade on the roller tending to move the latter out of the path of the blade; and means for moving said arm into such position that the roller is in the path of the blade and for resisting said latter force.

2. In combination, a signal biased in one direction, means for moving it in opposition to the biasing force, a rotatable member operatively connected with said signal, a blade carried by said member, a roller mounted to move into and out of the path of said blade; and means for moving the roller into the path of the blade to arrest the momentum of the signal when the latter has been moved to a given point by the motor, and for holding the roller in said path to prevent return of the signal in response to the biasing force.

3. In combination, a signal biased in one direction, a motor for moving it in opposition to the biasing force, a movable member operatively connected with the signal, a second member movable into and out of the path of the first member; means for moving the second member into the path of the first member to arrest the momentum acquired by the moving parts while being moved by the motor, when the signal has reached a given position to which it is driven by the motor, and for holding said second member in said path to prevent return of the signal in response to the biasing force; and a contact operatively connected with said second member for controlling the motor.

4. In combination, a signal biased in one direction, a motor for moving it in opposition to the biasing force, a movable member operatively connected with the signal, a second member movable into and out of the path of the first member; a contact operatively connected with said second member for controlling said motor, the contact being open or closed according as the second member is in or out of the path of the first member; and means for moving said second member into the path of the first member when the signal has been moved to a given position by the motor whereby to deënergize the motor and to arrest the momentum acquired by the moving parts while being moved by the motor, and to prevent return of the signal in response to the biasing force.

5. In combination, a signal biased in one direction, a motor for moving it in opposition to the biasing force, a movable member operatively connected with the signal, a second member movable into and out of the path of the first member; means for moving the second member into the path of the first member to arrest the momentum acquired by the moving parts while being moved by the motor when the signal has reached a given position to which it is driven by the motor, and for holding said second member in said path to prevent return of the signal in response to the biasing force.

6. In combination, a signal, a motor for moving it, a movable member operatively connected with the signal, a second member movable into and out of the path of the first member, and means for moving the second member into the path of the first member to arrest the momentum acquired by the signal while being moved by the motor.

7. In combination, a signal, a motor for moving it, a movable member operatively connected with the signal, a second member movable into and out of the path of the first member, means for moving the second member into the path of the first member to arrest the momentum acquired by the signal while being moved by the motor, and a contact operatively connected with said second member for controlling the motor.

8. In combination, a signal, a motor for moving it, a member operatively connected with said signal, a second member movable into and out of the path of said first member; a contact operatively connected with said second member for controlling the motor, said contact being open or closed according as the second member is in or out of the path of the first member; and means for moving said second member into the path of the first member thereby deënergizing the motor and arresting the momentum acquired by the moving parts while being moved by the motor.

9. In combination, a signal, a motor for moving it, a movable member, a friction clutch connecting said member with said signal, a second member movable into and out of the path of the first member, and means for moving said second member into the path of the first member to arrest the momentum acquired by the moving parts while being moved by the motor.

10. In combination, a signal biased in one direction, a motor for moving it in opposition to the biasing force, a device for arresting the momentum acquired by the signal while being moved by the motor, means controlled by said device for deënergizing the motor when the device is operative, and means controlled by the signal for rendering the said device operative when the signal is moved to a given position by the motor.

11. In combination, a signal biased in one direction, means for moving it in opposition to the biasing force, a rotatable member operatively connected with said signal, a projecting blade carried by said member; a pivotally mounted arm, two links pivotally mounted in said arm, a roller journaled in said links, the movement of the arm on its pivot being such that the roller moves into and out of the path of the blade; stops formed on the arm for limiting the swing of the roller and links relative to the arm; the relation between the blade, arm, links and roller being such that when the signal is moving in opposition to its bias and the roller is in the path of the blade, the line of action of the pressure between the blade and the roller lies substantially in the straight line joining the pivotal point of the roller and the pivotal point of the arm; and that when the signal is tending to move in response to the biasing force the said line of action of the pressure intersects said straight line in such direction that a force is then exerted by the blade on the roller tending to move the roller out of the path of the blade; the swing of the roller and links relative to the arm being such that the latter force is not excessive; and means for moving the arm into such position that the roller is in the path of the blade and for resisting said latter force.

In testimony whereof I affix my signature in presence of two witnesses.

JOHN P. COLEMAN.

Witnesses:
 A. HERMAN WEGNER,
 R. L. KISTLER.

Copies of this patent may be obtained for five cents each, by addressing the "Commissioner of Patents, Washington, D. C."